##

United States Patent [19]

Daniels et al.

[11] Patent Number: 5,431,371
[45] Date of Patent: Jul. 11, 1995

[54] CONVEYOR BELT CLAMPING AND PULLING APPARATUS

[75] Inventors: William J. Daniels, Orland Park; Gary E. Mitas, Downers Grove, both of Ill.

[73] Assignee: Flexible Steel Lacing Company, Downers Grove, Ill.

[21] Appl. No.: 61,162

[22] Filed: May 13, 1993

[51] Int. Cl.6 .............................................. B25B 25/00
[52] U.S. Cl. ................... 254/218; 294/132; 294/134
[58] Field of Search ................... 254/217, 218, 233; 294/81.61, 81.62, 104, 132–136

[56] References Cited

U.S. PATENT DOCUMENTS

| 492,972 | 3/1893 | Seeley | 294/132 X |
| 600,869 | 3/1898 | Hankin | 294/134 X |
| 995,525 | 6/1911 | Cocker | 294/134 |
| 1,219,395 | 3/1917 | Hascall | 294/132 |
| 1,344,485 | 6/1920 | Cherry | 294/134 X |
| 1,911,071 | 5/1933 | Duncan | 294/132 X |
| 2,506,029 | 5/1950 | Maasdam | 254/218 X |
| 4,681,359 | 7/1987 | Stolz | 294/81.21 |

FOREIGN PATENT DOCUMENTS 1097218  1/1961  Germany .................... 294/132

OTHER PUBLICATIONS

Advertisement for General Splice Corporation entitled "Minet Lightweight Aluminum Self-Tightening Power Clamps for Conveyor Belt Repairs."

Advertisement for Pul-tite Industries entitled "Pul-tite Belt Tighteners."

Primary Examiner—Daniel P. Stodola
Assistant Examiner—Michael R. Mansen
Attorney, Agent, or Firm—Fitch, Even, Tabin & Flannery

[57] ABSTRACT

A portable belt clamping and pulling apparatus is provided to grip and pull belt ends together for splicing belt ends of a conveyor belt. A pair of belt ends are clamped between respective pairs of I-beams, the clamped belt ends are pulled together by a come along mechanism, and the free ends of belt between the I-beams are maintained held together in a tension free environment to allow fastening together of the belt ends. The respective I-beams which clamp the belt ends are clamped together by a pair of clamping jaws which are slidable along the I-beams to any desired position therealong to accommodate different belt widths and allow positioning of the clamping jaws adjacent the sides of the belt regardless of the width of the belt. Thus, exerting the tension force close to the edges of the belt. The clamping jaws clamp in response to the chains of the come along mechanism pulling the clamping jaws toward one another, and the clamping jaws include respective pre-tightening screws for clamping the I-beams to the belt prior to the initiation of pulling by the chains so as to eliminate slippage the belt from between the I-beams during the initial pulling. Springs and rods between the I-beams limit cocking or pivoting of the I-beams during high tension. The belt is gripped against slipping by being bent in a serpentine path between I-beam flanges of different width spans.

15 Claims, 4 Drawing Sheets

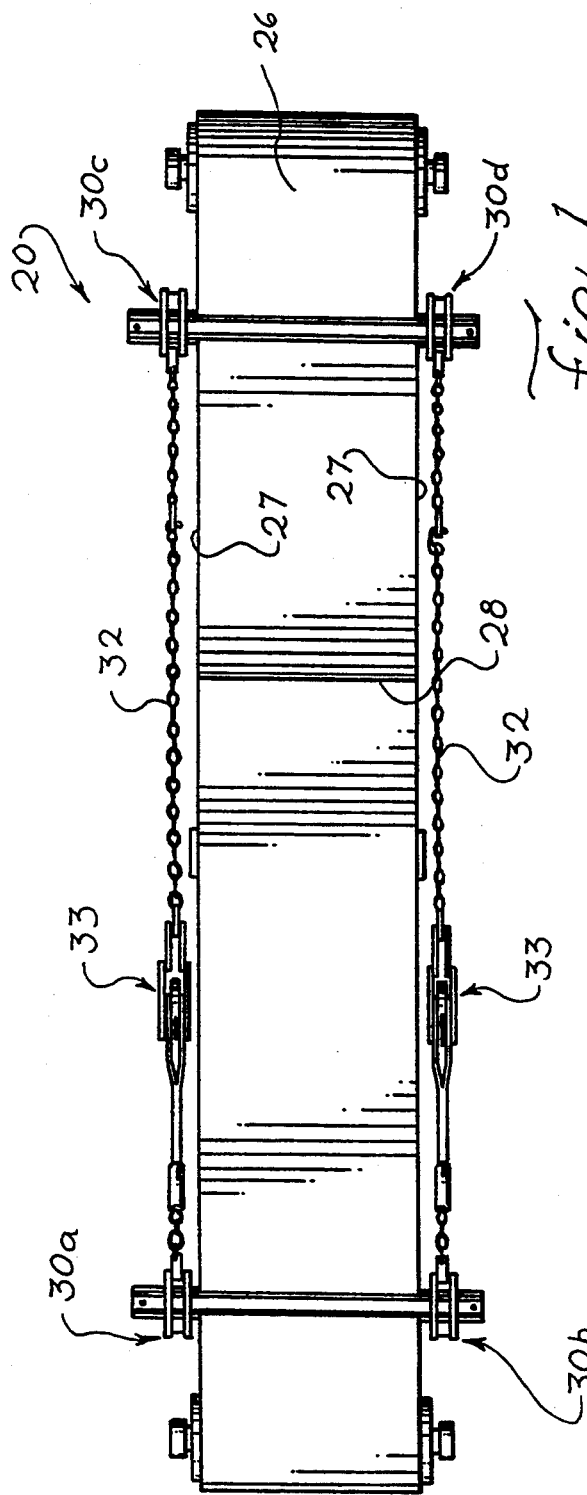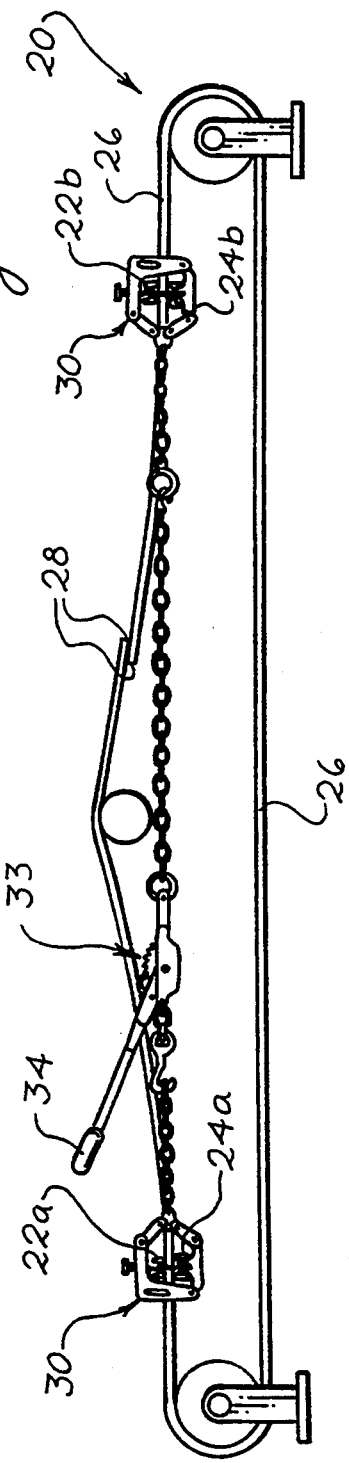

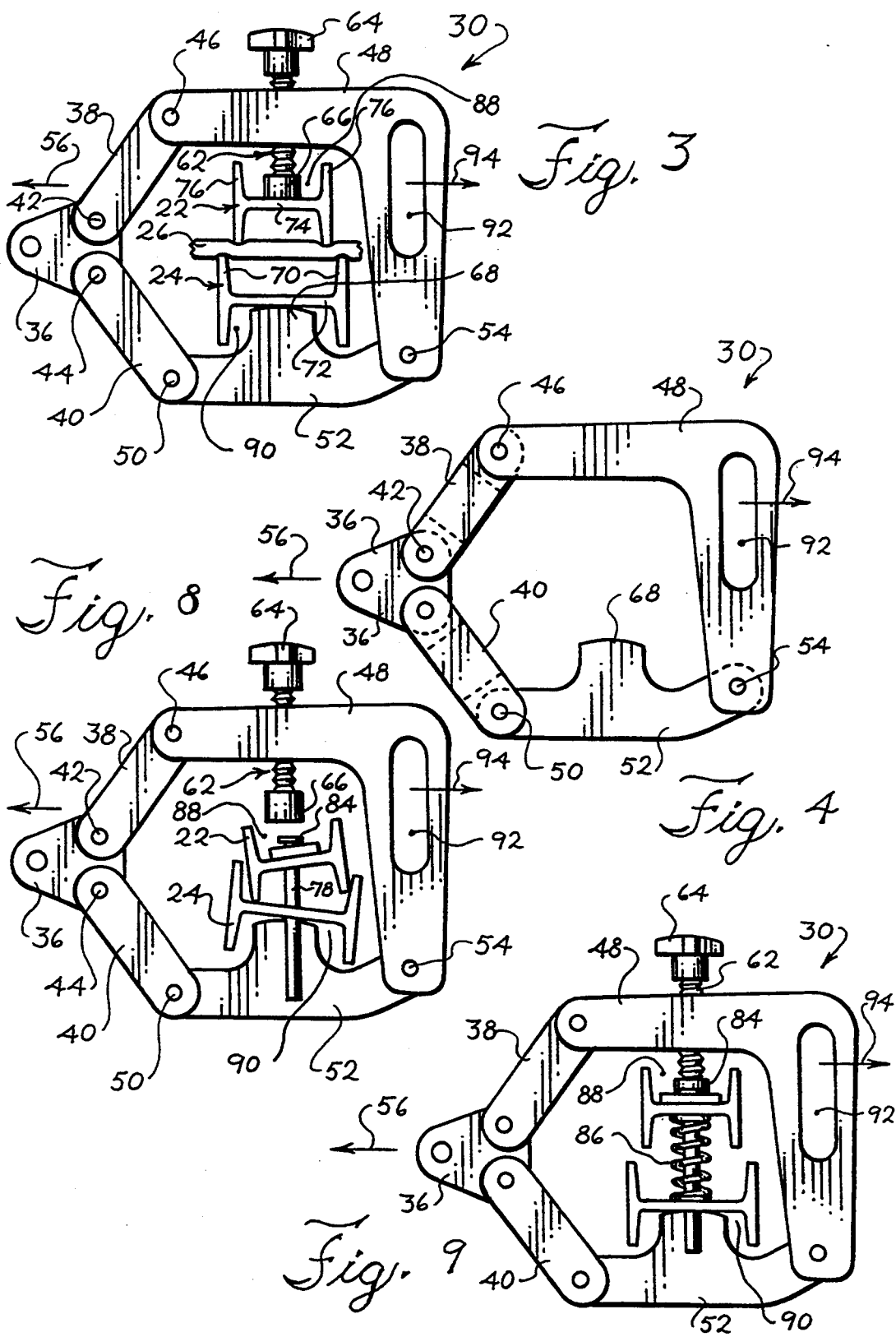

CONVEYOR BELT CLAMPING AND PULLING APPARATUS

FIELD OF THE INVENTION

The present invention pertains to a portable apparatus for gripping a pair of conveyor belt ends and pulling the belt ends together.

BACKGROUND OF THE INVENTION

During normal operation of a conveyor belt, the ends of the belt may be spliced together to form a continuous belt. The belt ends are connected together in such a manner that the continuous belt so formed is in tension throughout its length as it extends about rollers which define the continuous path of travel of the belt.

Conveyor belts have some elasticity, so that when pulled upon they stretch and become slightly elongated. The belts are tensioned about end rollers and in particular the drive rollers which engage and drive the endless belt. Upon rupture or tearing of the belt, the tension in the belt causes the portions of the belt on either side of the rupture to be pulled apart. Current methods and apparatus for re-connecting the belt ends at the point of belt rupture suffer numerous shortcomings. In order to splice the ends of the belt in the field, a portable belt gripping and tension device is brought to the location on the conveyor at which the rupture is located.

It is desirable to effect re-connecting of the belt ends together while the belt ends are flaccid, so that it is not necessary to deal with the forces tending to separate the belt ends from one another while attempting to connect the belt ends.

Known portable belt clamping and stretching devices include a pair of clamping plates together on either side of the belt in proximity with both of the respective belt ends for clamping the belt ends, and pulling the clamped belt ends toward one another. This stretches the belt and places the belt into tension over its length except over the end portions of the belt which are situated between the clamps, which end portions are slacked or flaccid, thereby allowing a splicing of the belt ends to one another in a tension-free environment.

It is known to utilize clamping jaws which close together about the clamping plates, to press the plates together, as the clamping jaws are pulled upon to pull the belt ends toward one another. The clamping force which the clamping jaws exert upon the clamping plates is directly proportional to the pulling force pulling the belt ends toward one another. That is, upon pulling on the clamping jaws to pull the belt ends toward one another, the clamping plates above and below the respective belt ends move closer toward one another to clamp the belt therebetween. This arrangement suffers numerous shortcomings, most of which are associated with slippage of the belt with respect to the clamping plates, as discussed below.

One cause of the undesirable slippage between the belt and the clamping plates is due to the fact that upon initial pulling on the clamping jaws to pull the belt ends toward one another, the clamping jaws and their associated clamping plates are pulled toward one another prior to the clamping plates having attained a sufficient clamping force on the respective belt ends. That is, when the clamping jaws are initially pulled upon, they do not tightly clamp the clamping plates to the belt. Hence, during the initial pulling, as the clamping plates are just beginning to clamp down on the belt ends, the clamping jaws and their associated clamping plates are being pulled toward one another. The clamping plates thus slip or slide across the belt until they are closed together sufficiently by the clamping jaws to prevent further slippage of the belt from between the clamping plates.

The initial slippage of the belt through the clamping plates is undesirable since it precludes precise positioning of the clamping plates at the belt ends, and such slippage may be a safety hazard. The initial slippage of the belt is also undesirable since this requires the operator to pull the belt ends further than he would otherwise have to in order to stretch the belt sufficiently. That is, chains or other pulling members interconnect the clamping jaws of opposite belt ends and shortening the length of the chains pulls the belt ends together. Thus, there is a need for a belt clamping apparatus which prevents initial slippage of the belt when the belt ends are initially pulled toward one another.

Another cause of slippage with current belt clamping and pulling apparatus is that the flat clamping plates, which are currently used to press together on opposite sides of the belt to grip the belt, do not provide a good gripping of belts of various widths between the flat plates. The clamping jaws which press the flat plates together are positioned at the outer ends of the plates to accommodate both narrow and wide belts between the spaced clamping jaws. Hence, for all but the widest belts, the clamping jaws are spaced outwardly from the sides of the belt. Thus, when the respective ends of the plates are pressed toward one another, the plates bow outwardly from their center. That is, since the clamping jaws are positioned outwardly of the sides of the belt, the clamping plates deflect the ends of the clamping plates toward each other and tend to raise or bow the central portions of the clamping plates over a substantial, central portion of the belt. Accordingly, the sides of the belt are clamped with high clamping forces with the central portions of the clamping plates receiving reduced clamping forces. There is a need for belt clamping members which provide a more uniform gripping of the belt across its width.

SUMMARY OF THE INVENTION

In accordance with the present invention, a conveyor belt clamping and pulling mechanism is provided which overcomes the aforementioned problems of the prior art. The aforementioned problem of slippage of the belt upon initial pulling on the clamping jaws to pull the belt ends toward one another is overcome by the incorporation of a pre-tightening device to pre-tighten the clamping members to the belt. That is, the pre-tightening device allows for movement of clamping members toward one another, and into clamping engagement with the belt portion therebetween, prior to the initiation of pulling on the clamping jaws. The preferred pre-tightening device includes manual adjustable tightening screws to tighten the clamping members onto the belt prior to initiation of pulling on the clamping jaws.

The problem of subsequent slippage of the belt through the clamping members upon pulling the belt ends toward one another is overcome by utilization of clamping members which provide a better grip than flat plates. Herein, the clamping members bend the belt from its flat, linear configuration into a serpentine configuration. The preferred clamping members are I-beams with flanges separated in the longitudinal direction of the belt. The clamping force on the I-beams causes the belt to curve around the flanges of the I-beams. The curving of the belt around the I-beam flanges has been found to provide improved gripping of the belt.

Still further reduction in the slippage of the belt through the belt clamping beams is attained by positioning the clamping jaws, which clamp the clamping beams about the belt, in close proximity to the sides of the belt. This prevents bowing of the center of the beams out of engagement with the belt, which bowing otherwise occurs when the clamping jaws are spaced considerably from the sides of the belt and the tension forces are applied to the clamping jaws at considerable distance from the belt edges.

To accommodate differently sized belts having different belt widths, while also allowing positioning of the clamping jaws at the sides of the belt regardless of the belt width, the clamping jaws are slidable to any position along the clamping beams. The clamping jaws slide within the channels defined by the I-beams. Hence, for narrower belts the clamping jaws may be moved adjacent the sides of the belt, whereat the clamping jaws are spaced close to one another. For wider belts, the clamping jaws may be slid further apart to the sides of the belt.

In accordance with another aspect of the present invention, the tendency of the upper and lower clamping beams becoming cocked or askew with respect to one another upon pulling the clamping jaws toward one another is reduced significantly by the provision of alignment means extending between the upper and lower I-beams. Springs and guide rods resist the tendency of I-beams to rotate about their front flanges to squeeze the belt harder at the front flanges than at the rear flanges which tend to rotate apart when high tension forces are applied to the I-beams.

The upper and lower clamping beams are maintained spaced from one another by springs disposed therebetween. The biasing force of the springs maintains the beams separated during initial insertion of the desired belt portion between the beams. The spring force is then overcome by the clamping force of the clamping jaws when it is desired to move the beams together about the belt, whereby the beams then move into clamping engagement with the belt.

BRIEF DESCRIPTION OF THE DRAWINGS

In the drawings, wherein like elements are referenced alike:

FIG. 1 is a plan view of a belt clamping and pulling apparatus embodying various features of the present invention, attached to a conveyor belt;

FIG. 2 is a side elevational view of the clamping and pulling apparatus of FIG. 1;

FIG. 3 is a side elevational view of a belt clamping jaw and clamping beams of the belt clamping and pulling apparatus of FIG. 1;

FIG. 4 is a side elevational view of belt clamping jaw of FIG. 1;

FIG. 8 is a side elevational view of the belt clamping jaw and belt pulling apparatus of FIG. 3, with an alignment pin extending between the beams;

FIG. 9 is a side elevational view of the belt clamping jaw and belt pulling apparatus of FIG. 8, shown with a biasing spring maintaining separation of the upper and lower beams;

DETAILED DESCRIPTION OF THE PREFERRED EMBODIMENTS

Figure 5:
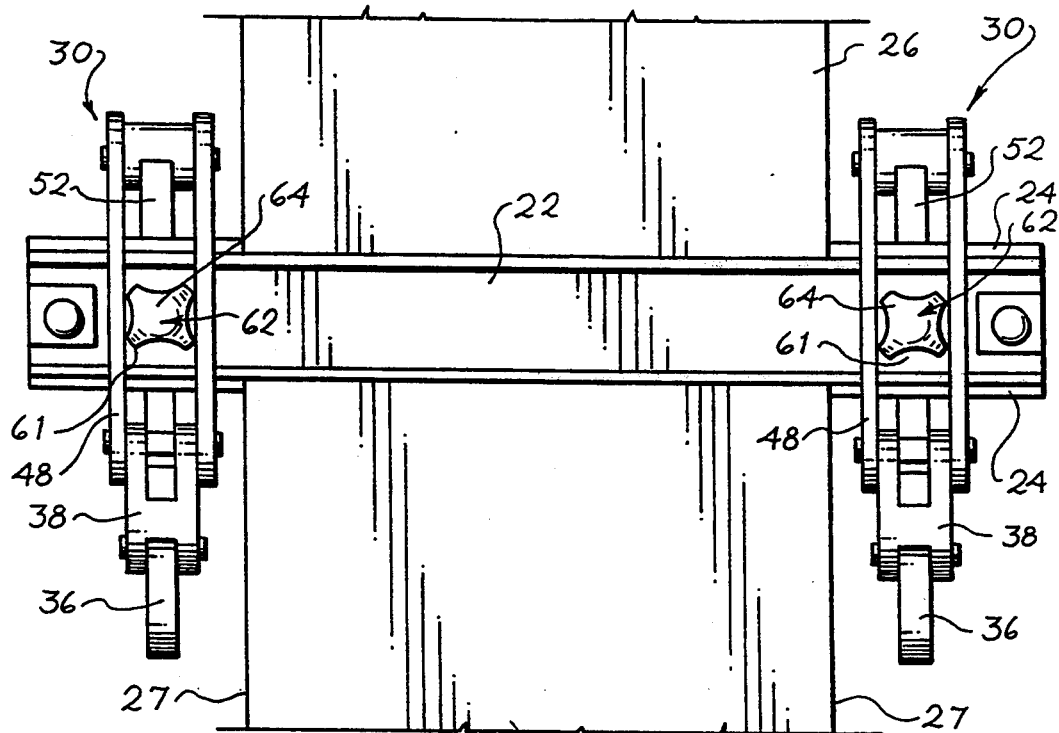
FIG. 5 is an enlarged plan view of the belt gripping and pulling apparatus of FIG. 1.
Figure 6:
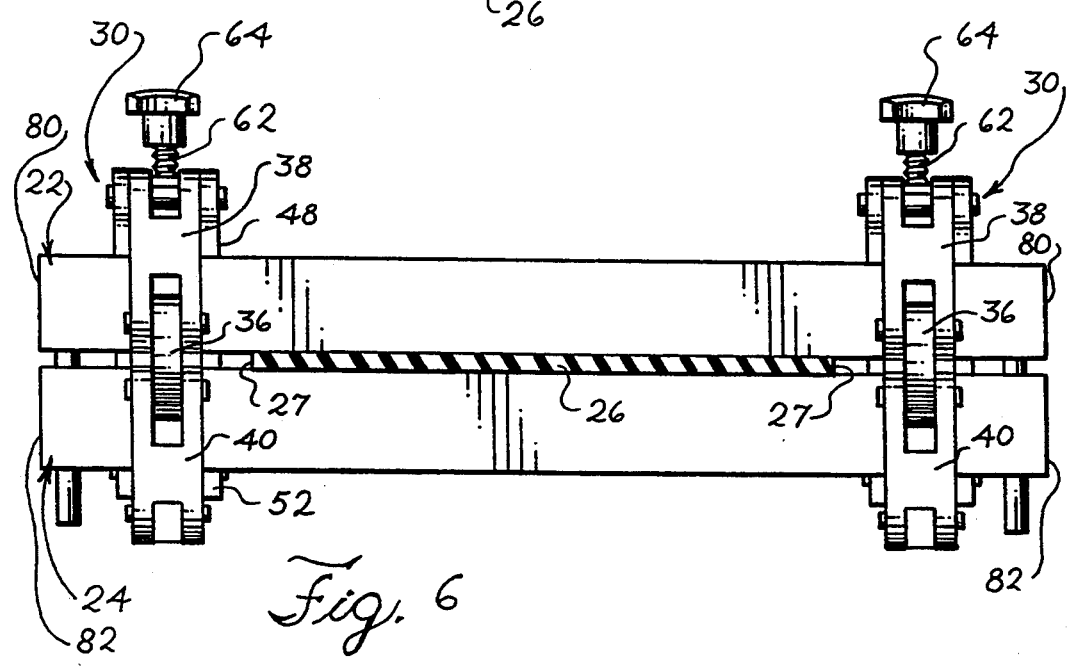
FIG. 6 is a front elevational view of the belt gripping and pulling apparatus shown in FIG. 5.

A belt clamping and pulling apparatus embodying various features of the present invention is illustrated in FIGS. 1–3, 5–6, and 8–11, and referred to generally by reference numeral 20.

With initial reference to FIGS. 1 and 2, the apparatus 20 comprises a first pair of upper and lower clamping members or beams, 22a and 24a, and a second pair of upper and lower clamping beams, 22b and 24b, which beam pairs clamp together about respective portions of a conveyor belt 26 in proximity with respective ends 28 of the conveyor belt 26 to allow pulling together of the belt ends by pulling members for fastening the belt ends together.

A first pair of clamping jaws 30a and 30b press together the first pair of upper and lower beams 22a and 24b, and a second pair of clamping jaws 30c and 30d press together the second pair of upper and lower beams 22b and 24b, into clamping engagement with respective end portions of the conveyor belt 26. The clamping jaws 30a and 30b associated with the first pair of clamping beams 22a and 24a are connected to respective clamping jaws 30c and 30d of the second pair of clamping beams 22b and 24b through pulling members such as variable length chains 32. The chains 32 each have a come-along mechanism 33, or other length varying mechanism, which operates upon advancement of the length-adjusting handles 34 thereof to shorten the length of the chains 32. Shortening of the chains 32 pulls the clamping jaws 30 toward one another to pull the clamped belt portions toward one another. Typically, such devices have a ratchet device therein which is turned by operation of the ratchet lever handle 34. Various tension devices may be used for exerting tension forces to pull the clamping jaws toward each other and to tension the belt.

The chains 32 pulling on the clamping jaws 30 also further tighten the clamping beams 22 and 24 onto respective portions of the belt 26, as discussed below. That is, pulling on the clamping jaws 30 effects movement of the I-beams 22 and 24 engaged by the clamping jaws being pulled upon from an open or release position in which the belt is loosely slidable between the I-beams, to a clamping position in which the I-beams 22 and 24 clamp the belt portion therebetween.

More specifically, in the illustrated embodiment which is shown in FIGS. 3, 4, 8, and 9, the clamping jaws 30 each comprise a linkage arrangement having a pulling link 36, with upper and lower intermediate links 38 and 40 pivotally connected near one of their respective ends, at pivot pins 42 and 44, respectively, to the pulling link 36. The upper intermediate link 38 is pivotally connected at pivot pin 46, near its other end, to an L-shaped upper clamping link 48; and the lower intermediate link 40 is pivotally connected at pivot pin 50, near its other end, to a lower clamping link 52. The upper and lower clamping links 48 and 52 are pivotally connected to one another at pivotal connection 54.

Pulling on the pulling link 36 in the direction of arrow 56 effects pulling down on the upper clamping link 48 at end 46, together with pulling upward on the lower clamping link 52 at end 50, whereby the upper and lower clamping links move toward one another. Thus, initially the respective upper and lower I-beams 22 and 24 are spaced from one another as shown in FIG. 9, but when the pulling links 36 of the clamping jaws 30 are pulled upon in the direction of arrow 56, the clamping jaws 30 move the I-beams from the spaced, open position toward a clamping position (FIG. 3) in which the I-beams clamp the belt. FIG. 4 shows the linkage arrangement of the clamping jaws 30 without the clamping beams 22, for clarity.

As discussed above, in the prior art there were problems realized due to slippage of the belt 26 from between the respective I-beams 22 and 24 upon initial pulling on the clamping jaws and/or clamping plates. To eliminate this initial slippage problem, the upper clamping link 48 includes a flange 61 at its upper, horizontal end having a threaded aperture therethrough. (see FIG. 5) A tightening screw 62 is threaded in the threaded aperture and extends into the region between the upper and lower clamping links 48 and 52. The tightening screw 62 is advanced downwardly, further into the region between the upper and lower clamping links 48 and 52, upon clockwise rotation of the tightening screw 62. The tightening screw 62 has an integral head 64 at the upper end of the screw 62 which extends above the upper clamping link 48, to facilitate manual gripping of the screw 62. The screw 62 also has an integral, flat bearing portion 66 at the lower end of the screw 62 which extends into the region between the upper and lower clamping links 48 and 52.

With reference to FIG. 3, the lower clamping link 52 of each of the clamping jaws 30 includes an integral, raised bearing surface portion 68 upon which the respective, lower I-beam 24 is supported. That is, the lower I-beam 24 is supported near one of its ends by the bearing surface portion 68 of a first clamping jaw 30, and supported near its other end by the bearing surface portion 68 of a second clamping jaw 30. The bearing surface portions 68 of the respective clamping jaws 30 are preferably slightly arcuate and sufficiently narrow that the bearing surface portions 68 fit easily between the opposite vertical flanges 70 of the lower I-beam 24. Hence, the horizontal portion 72 of the lower I-beam 24 rests on the arcuate bearing surfaces 68 of a pair of clamping jaws 30, with the vertical flanges 70 of the lower I-beam 24 preventing the lower I-beam 24 from sliding off of the bearing surface portion 68. The I-beams 22 and 24 are preferably formed of aluminum to minimize the overall weight of the apparatus.

As seen in FIG. 3, the lower I-beam 24 resides on the underside of the belt 26, with the upper I-beam 22 residing on the upper side of the belt. The bearing portion 66 of the tightening screw 62 bears against the horizontal portion 74 of the upper I-beam 22. Accordingly, upon tightening of the screw 62, the bearing surface 66 of the screw 62 bears against the horizontal portion 74 of the upper I-beam 22 and urges the upper I-beam 22 downwardly in the direction of the lower I-beam 24.

Accordingly, by pre-tightening the clamping jaws 30 about the I-beams 22 and 24, by tightening the tightening screws 62 sufficiently, prior to pulling on the pulling link 36 to draw the belt ends 28 together, the aforementioned problem of slippage of the belt 26 from between the upper and lower I-beams 22 and 24 upon initial pulling may be significantly reduced or prevented.

That is, sufficient tightening of the tightening screw 62 effects clamping of the belt 26 between the upper and lower I-beams 22 and 24 even prior to pulling on the pulling links 36. Thus, upon subsequent pulling on the pulling links 36 to draw the belt ends 28 together, the upper and lower I-beams 22 and 24 will be sufficiently clamped about the belt 26 that the belt 26 will not slip during the initial pulling on the pulling members 36 to draw the belt ends 28 together. That is, previously the clamping jaws 30 only closed sufficiently together to effect clamping of the belt 26 therebetween after the pulling link 36 was pulled upon. Since the clamping jaws 30 would not have closed sufficiently to clamp the belt 26 during the initial pulling, there would be slippage of the belt 26 during the interval between the initiation of pulling and the subsequent closing together of the upper and lower clamping links. The tightening screw 64 allows for clamping of the belt 26 prior to the initiation of pulling on the clamping jaws 30, which pre-tightening or clamping eliminates belt slippage upon the initial pulling.

Figure 10:
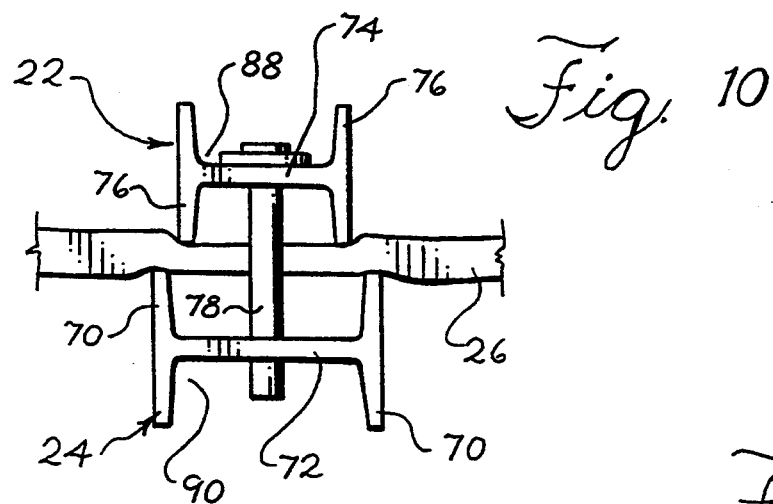
FIG. 10 is an enlarged side elevational view of a pair of I-beams in clamping engagement with a belt section.

As seen in FIG. 3, and particularly in FIG. 10, the I-beams 22 and 24 pinch the belt 26 and also distort the belt 26 into a serpentine configuration, when they clamp the belt. This pinching and curving of the belt 26 provides improved gripping of the belt 26 over conventional flat clamping plates.

The upper and lower I-beams 22 and 24 are preferably aligned and preferably have different spans, so that the vertical flanges 70 of the lower I-beam 24 are offset from the vertical flanges 76 of the upper I-beam 22. In the illustrated embodiment, the lower I-beam 24 has a wider span than the upper I-beam 22. Thus, as shown in FIGS. 3 and 10, the vertical flanges 76 of the upper I-beam 22 lie just inwardly of the vertical flanges 70 of the lower I-beam when the belt 26 is clamped between the upper and lower I-beams 22 and 24. This arrangement has been found to provide good clamping of the belt 26, both during the initial clamping of the belt 26 upon tightening the screw 64, and also during subsequent pulling on the belt to draw the belt ends 28 together.

With reference now to FIG. 8, the upper and lower I-beams 22 and 24 are slidably connected to one another by guide rods 78 which center the I-beam with respect to the lower I-beam. The upper and lower I-beams 22 and 24 both have apertures near their respective ends 80 and 82. A first guide rod 78 extends through the apertures near one end 80 of the I-beams, 22 and 24, and a second guide rod 78 extends through the apertures near the other end 82 of the I-beams 22 and 24.

The guide rods 78 serve several functions. The guide rods 78 maintain the upper and lower beam pairs 22 and 24 interconnected as a single unit. The guide rods 78 also maintain the upper I-beam 22 centered with respect to the lower I-beam 24, thereby assuring that upon clamping of the belt 26, the vertical flanges 76 of the upper I-beam 22 remain immediately inward of the vertical flanges 70 of the lower I-beam 24. Preferably the guide rod 78 has an enlarged head 84 which is permanently fixed to the upper I-beam 22.

As shown in FIG. 8, the upper I-beam 22 falls down under the influence of gravity onto the lower I-beam 24. Thus, to insert a belt end 28 between the upper and lower I-beams 22 and 24, it is necessary with this arrangement to first lift up the upper I-beam 22 to provide clearance between the upper and lower I-beams 22 and 24.

The springs 86 are useful in reducing the amount of cocking of the I-beams in which the forward flanges 70, 76 are pulled closer together, as shown in FIG. 8, and the rear flanges 70, 76 are pivoted away from each other with the consequence that the rear flanges are not effectively gripping the belt.

More particularly, with continued reference to FIG. 9, the springs 86 bias the upper I-beam 22 upwardly into abutment with the bearing surfaces 66 of the respective tightening screws 62. This maintains the upper and lower I-beams 22 and 24 generally parallel and spaced from one another initially and the springs resist the rotation of the front flanges 70 and 76 toward each other and thereby reduce cocking of the I-beams 22 and 24.

Tightening of the tightening screws 62 overcomes the biasing force of the springs 86 to move the upper I-beam 22 downward toward the lower I-beam 24. The springs 86 have sufficient elasticity that the screw 62 may be screwed manually far enough downward to move the upper I-beam 22 into clamped engagement with a belt segment 26 situated between the upper and lower I-beams 22 and 24. The combination of the spring 86 and the guide rods 78 prevents the upper and lower I-beams 22 and 24 from becoming askew with respect to one another.

Figure 7:
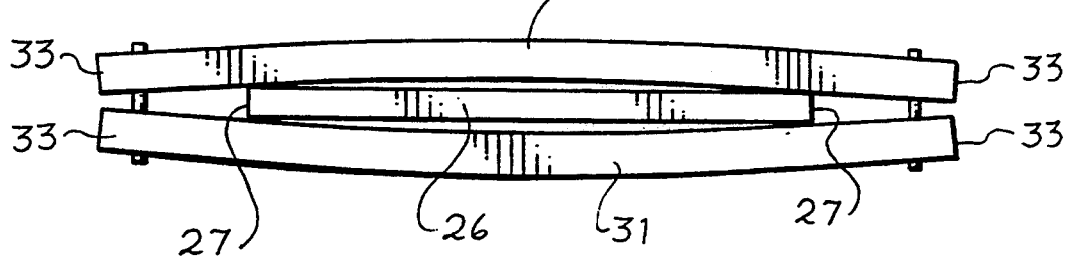
FIG. 7 is an end elevational view of a pair of flat, prior art clamping plates clamping a belt portion therebetween, to illustrate the outward bowing of the center portion of the plates away from the belts when the plates are pressed together at a location spaced from the sides of the belt.

In their unclamped position, the clamping jaws 30 are slidable along the I-beams 22 and 24 from one end to the other, to optimally accommodate belts of different widths. That is, in the prior art, as illustrated in FIG. 7, the clamping plates 31 were clamped together at or near the ends 33 of the plates regardless of the width of the belt 26 being clamped. Hence, with a relatively narrow belt 26, the plates 31 were clamped at a location a considerable distance from the belt ends 27. This results in bowing of the clamping plates 31 as shown in FIG. 7. As discussed above, the bowing is undesirable since it reduces the area of contact between the belt 26 and the plates 31, thus reducing the clamping engagement of the belt by the plates 31. As shown in FIG. 7, when the clamping plates bow they concentrate the pulling and gripping forces on the edges of the belt, leaving the central portion of the belt with less clamping and pulling forces than at the belt edges. Thus, the side edges of the belt are crushed with heavy forces while the middle of the belt is not severely clamped. It is desirable to clamp the plates, or as in the present invention, clamp the I-beams, adjacent the belt ends 27 to minimize the bowing effect.

In order to accommodate belts of different widths, and allow for positioning of the clamping jaws 30 adjacent the belt side edges 27 regardless of the belt width, the clamping jaws 30 are slidable to any desired position along the length of the I-beams 22 and 24. That is, the upper and lower I-beams 22 and 24 are of generally equal length, and are made sufficiently long to extend beyond the sides 27 of the belt 26 for the widest belt which may be employed.

The bearing surfaces 66 of the tightening screws 62 slide within the U-shaped channel 88 defined by the upper half of the upper I-beam 22, and the bearing surface portions 68 of the lower clamping link 52 slide within the U-shaped channel 90 defined by the lower half of the lower I-beam 24, to allow sliding repositioning of the clamping jaws 30 to any desired position along the length of the I-beams 22 and 24.

Figure 11:
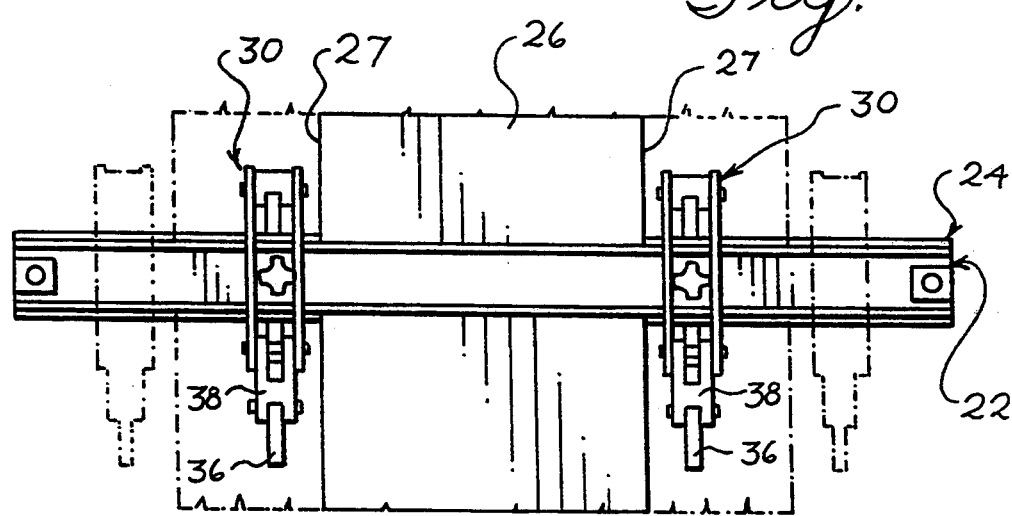
FIG. 11 is a plan view of the belt clamping and pulling apparatus of the present invention, illustrating in phantom the repositioning of the clamping jaws to accommodate belts of different widths.

FIG. 11 illustrates the variable positioning of the clamping jaws 30 dependent upon the width of the belt 26 to be clamped. A relatively wide belt 26 is illustrated in phantom and the position of the clamping jaws 30 corresponding to this wide belt width are also illustrated in phantom. For a narrower belt 26, indicated by solid lines in FIG. 11, the clamping jaws 30 are moveable inwardly toward one another to the position shown, adjacent the belt side edges 27. Manifestly, the clamping jaws 30 are not limited to these two positions, and they may be slid to any desirable position along the length of the I-beams 22 and 24. Accordingly, any width of belt narrower than the length of the I-beams 22 and 24 may be clamped directly adjacent the side of the belt by the clamping and pulling apparatus 20 of the present invention.

With the clamping jaws 30 positioned adjacent the belt side edges 27, the aforementioned bowing problem is substantially eliminated. Accordingly, this slidable clamping jaw aspect of the present invention substantially eliminates the bowing problem of the prior art, and provides improved belt clamping without slippage.

In practice, to connect the belt ends 28 of a new belt 26 to form a continuous belt, or to connect the belt ends 28 formed upon tearing of a belt 26 to reform a continuous belt, a first belt end 28 is passed between a first upper and lower I-beam pair 22 and 24, in between the pair of clamping jaws 30 which support the I-beams 22 and 24. The clamping jaws are oriented, and the belt 26 is inserted with respect to the clamping jaws 30, such that the belt end 28 extends in the direction of arrows 56; that is, the belt end 26 extends in the direction in which it is to be pulled, as shown in FIG. 2.

After being passed between the upper and lower I-beams 22 and 24, and the I-beams positioned at the desired location near the belt end 28, the tightening screws 62 of the clamping jaws 30 are manually rotated clockwise to push the upper I-beam 22 downward. The screw 62 is rotated until the upper I-beam 22 is moved sufficiently downward that the portion of the belt 26 situated between the upper and lower I-beams 22 and 24 is clamped therebetween.

Thereafter, the other belt end 28 is inserted through the second pair of I-beams 22 and 24, and the tightening screws tightened to clamp the belt 26 between the upper and lower I-beams 22 and 24, in the same manner as the first belt end 28 described above.

At this point, the chains 32 extending between the respective clamping jaws 30 of the first belt end and the clamping jaws of the second belt end are slacked. Advancement of the length-adjusting handles 34 of the come-along mechanisms 33 shortens the length of the chains 32, to take up the slack in the chains 32 and begin pulling the clamped belt ends 28 toward one another. The pulling force which the chains 32 exert on the pulling links 36 of the clamping jaws 30 increases clamping force of the clamping jaws 30 onto the I-beams 22 and 24 to clamp more tightly against the belt ends as they begin to be pulled toward one another.

Further advancement of the handle 34 draws the belt ends 28 together. After the belt ends 28 have been drawn together, any of a variety of known belt fastening devices may be employed to permanently or temporarily join the belt ends together. The clamping and pulling apparatus 20 of the present invention holds the belt ends 28 together without any separating force acting on the belt ends 28. This allows for the belt joining to be performed in the absence of separating forces, as desired.

After the completion of the belt end connection, the comeback mechanism is released to relieve the tension in the chains and substantially eliminate the pulling force of the chains on the clamping jaws 30. Thereafter, the upper and lower I-beams may be removed from the belt by first loosening the tightening screw 62 and opening the clamping jaws 30 to allow sliding of the lower I-beam from its location under the belt and the upper I-beam and clamping jaws 30 may be lifted from the top side of the now endless belt. Thus, first the tightening screws 62 are loosened, then the upper and lower clamping links 48 and 52 separated.

A hand grip in the form of an elongated slot 92 is provided in the vertical portions of the L-shaped upper clamping links 48. While the operator maintains this pulling force on the upper clamping links 48 to maintain separation of the clamping jaws 48 and 52, and thus separation of the I-beams 22 and 24, the clamping jaws may be slid laterally outward from the belt and disengaged from their respective I-beams 22 and 24. Thereafter, the operator may release the upper clamping links 48 to allow the clamping jaws 30 to return to their natural configuration, with the I-beams 22 and 24 slightly separated, for use of the clamping and pulling apparatus 20 in subsequent applications.

While the invention has been described with regard to its preferred embodiments, which constitute the best mode known to the inventor, it should be understood that various changes and modifications may be made without departing from the scope and spirit of the invention which is intended to be set forth in the claims appended hereto.

What is claimed is:

1. A portable belt clamping and pulling apparatus for clamping each of a pair of belt portions in proximity with respective ends thereof, and pulling the belt ends toward one another, to facilitate connection of the belt ends together, the apparatus comprising:
   a first pair of clamping members having respective first ends and second ends for accommodating a first belt portion between said first pair of members, said first belt portion being in proximity to a first belt end;
   a second pair of clamping members having first ends and second ends for accommodating a second belt portion between said second pair of members, said second belt portion being in proximity to a second belt end;
   a first pair of clamping jaws engageable with said first pair of clamping members and a second pair of clamping jaws engageable with said second pair of clamping members,
   a pulling means extending between the first pair of clamping jaws and the second pair of clamping jaws, the pulling means exerting a force through the clamping jaws to shift the clamping members from a release position in which the clamping members do not clamp a belt portion therebetween and a clamping position in which the clamping jaws move the respective clamping members to tightly clamp the belt portion therebetween when the means for pulling is pulling;
   said pulling means engageable with respective pulling member means of the clamping jaws to move said clamping jaws to said clamping position and pull the clamping jaws and the respective belt portions clamped thereby toward one another to facilitate connection of the belt ends; and
   a first of pair of flange members spaced apart at a first distance to define a depression of a first width therebetween on a first one of the clamping members, and a pair of second flange members spaced apart at a lesser distance than the first width to abut the belt at locations over the depression and to force the belt to curve down into the depression.

2. An apparatus in accordance with claim 1 wherein each of said first and second pairs of clamping members is an I-beam having a cross-section in the general shape of the letter I.

3. An apparatus in accordance with claim 2 wherein one I-beam of each of said pairs of I-beams is of smaller width than the other I-beam of said respective pairs to force the belt to bend when gripped by the I-beams.

4. An apparatus in accordance with claim 2 wherein flanges on said I-beams, the flanges of the first I-beam being positioned within flanges on the second I-beam to effect curvature of the belt portion clamped therebetween when said clamping jaws are moved to their clamping position.

5. An apparatus in accordance with claim 1 including a pre-tightening means engageable with the clamping members for manually adjusting the distance between said upper and lower clamping members to clamp the belt portion between said upper and lower clamping members prior to said pulling on said pulling member engaging means, to reduce slippage of the belt portion with respect to the members upon initial pulling of the clamping jaws.

6. An apparatus in accordance with claim 5 wherein said pre-tightening means comprises threaded members for abutting the clamping jaws on opposite sides of the belt portions and for applying force to the clamping members to clamp the belt portions initially prior to the force for tightly clamping from the pulling means.

7. An apparatus in accordance with claim 1 further including alignment means in engagement with respective upper and lower clamping members for aligning the same to substantially prevent the respective upper and lower clamping members from becoming cocked with respect to one another upon pulling by said pulling means.

8. An apparatus in accordance with claim 1 further including a pair of spaced guide rods extending between the upper and lower clamping members, one of said springs encircling each of the guide rods.

9. A portable belt clamping and pulling apparatus for clamping each of a pair of belt portions in proximity with respective ends thereof, and pulling the belt ends toward one another, to facilitate connection of the belt ends together, the apparatus comprising:
   a first pair of clamping members having respective first ends and second ends for accommodating a first belt portion between said first pair of members, said first belt portion being in proximity to a first belt end;

a second pair of clamping members having first ends and second ends for accommodating a second belt portion between said second pair of members, said second belt portion being in proximity to a second belt end;

a first pair of clampings jaws engageable with said first pair of clamping members and a second pair of clamping jaws engageable with said second pair of clamping members;

a pulling means extending between the first pair of clamping jaws and the second pair of clamping jaws, the pulling means exerting a force through the clamping jaws to shift the clamping members from a release position in which the clamping members do not clamp a belt portion therebetween and a clamping position in which the clamping jaws move the respective clamping members to a position in which they clamp the belt portion therebetween when the pulling means is pulling;

alignment means in engagement with the upper and lower clamping members to substantially prevent the upper and lower clamping members from becoming cocked with respect to one another upon pulling by said pulling means;

said alignment means comprising springs located between the first and second clamping members.

10. A belt clamping mechanism for use in a belt clamping and pulling apparatus to clamp an end of a belt, said belt clamping mechanism comprising:

an upper clamping member and a lower clamping member in spaced relation for receiving said belt end therebetween;

clamping jaws engageable with both said upper and lower clamping members and moveable, when pulled upon, from an open position in which the upper and lower clamping members engaged with the clamping jaws are in spaced relation, toward a clamping position in which the upper and lower clamping members clamp said belt end therebetween;

a tension device connected to the clamping jaws for exerting a pulling force on the clamping jaws to shift the jaws to the clamping position and to tension the belt end; and pre-tightening means for moving said upper and lower clamping members into clamping engagement with said belt and for exerting a first clamping force to prevent slippage of the clamping members along the belt when the clamping jaws are pulled prior to pulling of said clamping jaws by the tension device to tension the belt end, the tensioning device pulling on clamping jaws to exert increased clamping force of greater magnitude than said first clamping force to tightly clamp the belt during pulling of the belt tensioning device.

11. A belt clamping mechanism in accordance with claim 10 wherein said clamping jaws are moveable along the length of the clamping members to allow positioning of the clamping jaws adjacent the sides of the belt with belts of different widths.

12. A belt clamping mechanism in accordance with claim 10 in which the lower and upper clamping members are I-beams with end flanges, the end flanges of the upper I-beam being spaced relative to end flanges of the lower I-beam end flanges to bend the belt about the respective flanges thereby improving the grip on the belt.

13. A belt clamping mechanism for use in a belt clamping and pulling apparatus to clamp an end of a belt, said belt clamping mechanism comprising:

an upper clamping member and a lower clamping member in spaced relation for receiving said belt end therebetween;

clamping jaws engageable with both said upper and lower clamping members and moveable, when pulled upon, from an open position in which the upper and lower clamping members engaged with the clamping jaws are in spaced relation, toward a clamping position in which the upper and lower clamping members clamp said belt end therebetween;

a tension device connected to the clamping jaws for exerting a pulling force on the clamping jaws to shift the jaws to the clamping position and to tension the belt;

pre-tightening means for moving said upper and lower clamping members into clamping engagement with said belt prior to pulling of said clamping jaws by the tension device to tension said belt;

the upper and lower clamping members each having a forward edge and a rearward edge; and springs positioned between the upper and lower clamping members to reduce cocking of forward edges of the clamping members relative to the rearward edges of the clamping members.

14. A belt clamping mechanism for use in a belt clamping and pulling apparatus to clamp an end of a belt, said belt clamping mechanism comprising:

an upper clamping member and a lower clamping member in spaced relation for receiving said belt end therebetween;

clamping jaws engageable with both said upper and lower clamping members and moveable, when pulled upon, from an open position in which the upper and lower clamping members engaged with the clamping jaws are in spaced relation, toward a clamping position in which the upper and lower clamping members clamp said belt end therebetween;

a tension device connected to the clamping jaws for exerting a pulling force on the clamping jaws to shift the jaws to the clamping position and to tension the belt;

pre-tightening means for moving said upper and lower clamping members into clamping engagement with said belt with a force of a first magnitude prior to pulling of said clamping jaws by the tension device to clamp the belt with a force of greater magnitude; and said clamping jaws and said pre-tightening means being moveable together along the length of the clamping members to allow positioning of said clamping jaws and said pre-tightening means adjacent the sides of the belt with belts of different width.

15. A belt clamping mechanism for use in a belt clamping and pulling apparatus to clamp an end of a belt, said belt clamping mechanism comprising:

an upper clamping member and a lower clamping member in spaced relation for receiving said belt end therebetween;

forward and rearward clamping flanges on each of the upper and lower clamping members for clamping against the belt;

clamping jaws engageable with both said upper and lower clamping members and moveable, when pulled upon, from an open position in which the upper and lower clamping members engaged with the clamping jaws are in spaced relation, toward a clamping position in which the forward and rearward flanges of the upper and lower clamping members clamp said belt end therebetween;

a tension device connected to the clamping jaws for exerting a pulling force on the clamping jaws to shift the jaws to the clamping position and to tension the belt; and alignment for positioning the upper and lower clamping members to substantially resist a rotation of the upper and lower clamping members about their forward flanges.

* * * * *

UNITED STATES PATENT AND TRADEMARK OFFICE
CERTIFICATE OF CORRECTION

PATENT NO. : 5,431,371
DATED : July 11, 1995
INVENTOR(S) : Daniels, et al

It is certified that error appears in the above-indentified patent and that said Letters Patent is hereby corrected as shown below:

Column 9, line 62, after "members" change "," (comma) to —;—.

Column 10, line 11, change "a first of pair of flange members" to —a pair of first flange members—.

Signed and Sealed this

Nineteenth Day of December, 1995

Attest:

BRUCE LEHMAN

*Attesting Officer*  *Commissioner of Patents and Trademarks*